United States Patent Office 3,801,640
Patented Apr. 2, 1974

3,801,640
PROCESS FOR REDUCING NITROSUBSTRATES TO CORRESPONDING AMINES BY USE OF HOMOGENEOUS NICKEL CATALYSTS IN THE PRESENCE OF HYDROGEN AND CARBON MONOXIDE
John F. Knifton, Poughquag, N.Y., assignor to Texaco, Inc., New York, N.Y.
No Drawing. Filed June 8, 1972, Ser. No. 260,948
Int. Cl. C07c 85/10
U.S. Cl. 260—563 D          14 Claims

ABSTRACT OF THE DISCLOSURE

This invention concerns the use of homogeneous nickel catalysts to reduce nitroparaffinic and nitroaromatic substrates in the presence of carbon monoxide and hydrogen to their corresponding amines.

This invention concerns the use of homogeneous nickel catalysts to reduce nitroparaffinic and nitroaromatic substrates to corresponding amines. More particularly, this invention concerns the use of solutions of nickel salts in the presence of both carbon monoxide and hydrogen as reducing agents for nitroparaffins. These agents are especially useful as reducing agents for higher carbon containing nitroparaffins and compared to heterogeneous catalysts, exhibit good selectivity and moderate yields.

BACKGROUND OF THE INVENTION

Until comparatively recently homogeneous metal catalysts have mainly been used in the conversion of unsaturated organic molecules particularly those with olefinic and acetylenic bonds to their hydrogenated oxygenated and/or isomerized derivatives. Particularly favored were linear olefins both of the alpha and internal type. Homogeneous catalysts have become especially popular in these reductions because they appear to offer several practical advantages over heterogeneous catalysts. Typical heterogeneous catalysts comprise an inert microporous support such as alumina, carbon, magnesia, chromia, silica and their mixtures, having microporous structure and a very large internal surface area which can, in some instances, approach areas of 1,000 square meters per gram or even higher. Ordinarily these catalytic supports contain or have deposited upon them finely divided and activated metals or metalloids. These include platinum, palladium, nickel, rhodium and the like. The very nature of their physical structure causes these heterogeneous catalysts to form distinct and separate phases in the reaction mixture which, it can be theorized, minimize contacts between the substrate to be converted and the catalytic entity. Further, because the activity of these catalysts is believed to be intimately related to their large surface area, many of these types of heterogeneous catalysts are readily deactivated or poisoned by a variety of materials known as catalyst poisons. This, in turn, requires fairly frequent replenishment, or where economically feasible, low cost processes of regeneration. Other disadvantages generically associated with heterogeneous catalysts are that they usually require more extreme conditions of temperature and pressure, and to some extent exhibit relatively poor selectivity.

By selectivity, as defined herein, is meant the efficiency in catalyzing a desired conversion relative to other undesired reactions. In this instance reduction of the nitro group to the amine is the desired conversion. Selectivity is usually expressed as a factor representing the amount of the amine formed, divided by the amount of starting nitrosubstrate converted. Amine yield here refers to the fraction representing the amount of amine formed, divided by the amount of nitrosubstrate charged. Inasmuch as low selectivity, catalyst poisoning, as well as lower yields, are undesirable problems more commonly associated with heterogeneous than homogeneous catalysts, there has been an increasing tendency to turn to the latter type catalysis.

Recently, the applicant has developed a novel process and has provided reaction parameters which enable the extension of homogeneous catalytic techniques to be extended to the reduction of higher carbon containing nitroparaffins ($C_{10}$–$C_{30}$) and nitroaromatics ($C_6$–$C_{30}$) to their corresponding amine. Not only are selectivities and yields good, but the resultant amine products can be recovered from the reaction mixtures by standard procedures normally used in amine isolation and purification. An interesting and unexpected aspect of the instant process is that the process conditions which resemble those employed in the "oxo" process primarily yield amines rather than the expected oxygenated products such as aldehydes and ketones.

PROCESS DESCRIPTION

In the broadest contemplated practice of this invention, paraffinic or aromatic amines, or mixtures thereof, are produced from paraffinic or aromatic nitro compounds in a catalytic reduction reaction by:

(a) Contacting the nitroparaffinic or aromatic substrate to be reduced with a catalytic quantity of nickel salt catalyst which is at least partially solubilized in a basic solvent media comprised of a nitrogenous base and a polar co-solvent.

(b) Heating the reaction mixture to at least about 50° C. in the presence of at least a stoichiometric (with reference to nitrosubstrate) quantity of both hydrogen and carbon monoxide, under superatmospheric pressures, until substantial reduction of the nitrosubstrate to the corresponding amine takes place.

In the favored practice of this invention, paraffinic amines or aromatic amines are produced by a process comprising the following steps:

(a) Admixing the nitrosubstrate with one or more nickel salt catalysts, the molar ratio of said nitrosubstrate to said nickel catalyst ranging from about 0.05 to 1.0 mole of catalysts for each mole of nitrosubstrate, in the presence of a basic solvent media comprising a polar solvent and a nitrogenous base, to form a reaction admixture, (b) Heating said reaction admixture between about 100–250° C. under superatmospheric pressures ranging from about 100 p.s.i.g. and upwards, under an environment of gaseous hydrogen and carbon monoxide for at least a period of time sufficient to substantially reduce said nitrosubstrate to its corresponding amine, and (c) Isolating said amines contained therein.

PROCESS COMPONENTS

Nitrosubstrate.—This is the generic term that is used to describe the nitro compounds that can be reduced to the corresponding amine product using the process of this invention. More specifically, it refers to paraffinic nitro compounds both linear and cyclonitroparaffins having 3 to 30 carbon atoms or higher or aromatic nitro compounds containing 6 to 30 carbon atoms, said compounds containing at least one nitro group per molecule. The most useful paraffinic substrates are the mononitro linear and cyclic-nitroparaffins such as the nitrobutanes, nitropentanes, nitrohexanes, nitroheptanes, nitrooctanes, nitrononanes, nitrodecanes, nitrododecanes, as well as their higher homologues. The favored nitroparaffinic substrates are mixtures of higher carbon content linear nitroparaffins containing from 10 to 20 carbon atoms, with the preferred nitroparaffin substrates being those n-linear nitroparaffin mixtures containing 10 to 14 carbon atoms.

The nitroaromatic substrates utilized can be any mono- or dinuclear aromatic containing at least 6 carbon atoms up to 20 carbon atoms, said substrates having at least one nitro ($NO_2$) group per molecule. These include the mononuclear mononitroaromatics such as nitrobenzene, nitrotoluenes, nitroxylenes and nitromesitylene, as well as the corresponding polynuclear mono nitroaromatics such as 1 - (alpha)-nitronaphthalene, 2-(beta)-nitronaphthalene and 9-nitroanthracene, and their alkylated analogues in which the alkyl groups contain 1 to 8 carbon atoms. Also suitable as substrates are polynitroaromatics such as the p- and m-dinitrobenzenes, the dinitrotoluenes and the dinitroxylenes, as well as the nitroaromatics containing other functional groups. The latter include p-nitroaniline, 1 - chloro-4-nitrobenzene, p-nitroacetophenone, p-nitroanisole and 1-bromo-4-nitrobenzene among others.

Both the nitroparaffins and the nitroaromatic substrates can be derived from any number of different nitration procedures such as vapor-liquid phase nitration, liquid-liquid nitration and the like. The favored nitrated substrates are derived from the vapor-liquid phase nitration of mixtures of n-paraffins or single, discrete mononuclear aromatics such as benzene, toluene or xylenes. The substrates to be reduced can be in the form of single, discrete nitrated substrates or as their unresolved mixtures, neat or containing inert solvents or diluents. The latter are typified by paraffins, alkyl ethers and the like. Mixtures of nitroparaffins containing 10 to 14 carbon atoms are preferred since they are readily available at relatively low cost and they lend themselves to substantially complete conversions to the desired corresponding amine within relatively short reaction times. Similarly, because of availability and efficacy nitroaromatics containing 6 to 10 carbon atoms are the preferred nitroaromatics.

INERT DILUENT AND SOLVENTS

The novel reduction process can be run most readily in the presence of sufficient inert diluent to form a two-phase reaction mixture. Since a two-phase reaction mixture offers the most convenient vehicle in which to concentrate the product amines, particularly paraffinic amines, the use of inert solvent is preferred in some instances. Furthermore, inasmuch as the preceding nitration of the substrate is frequently conducted in a reaction mixture containing a large excess of the unreacted precursor as compared to nitrating agent, the nitro substrate for reduction can contain as much as 75 to 85 weight percent of the unreacted starting material and only 25 to 15 weight percent as nitrated substrate. However, broadly speaking, any liquid in which the nitrated substrates are soluble and which are inert to reduction under the conditions of the inventive process, can be used as diluents. These include n-paraffins and iso-paraffins and mixtures thereof, alkyl ethers, such as diethyl ether, dibutyl ether, aromatics such as benzene, toluene and xylene, as well as mixtures of two or more of the diluents.

NITROGENOUS BASE MEDIUM

It is necessary that the nickel salt homogeneous catalyst be handled in a basic solvent medium comprised of a nitrogenous base plus a solvating agent which is polar and which contains an active hydroxyl group. Suitable solvating agents include water, mono and polyhydric aliphatic, aromatic and cycloaliphatic alcohols such as methanol, ethanol and the propanols. The favored nitrogenous bases are non-polymeric and generally selected from aliphatic amines which are miscible with water and/or alkanols, which have a pKa base strength of about 9.0 to about 11.5 (when measured at 25° C.–20° C. in at least a 0.1 molar aqueous metal salt solution) and which are capable of solubilizing the nickel salt. Ethylenediamine, 1,2-propanediamine, 1,3-propanediamine, 3,3'-diaminedipropylamine, 1,6 - hexanediamine, triethylenetetramine and the like function well, are readily available and hence are preferred. Ammonia, morpholine and diethanolamine are less satisfactory, but can also be used.

It is believed, without limiting the invention thereby, that under the experimental conditions outlined above, the basic solvent media helps to promote the in situ formation of nickel carbonyl according to the stoichiometry set forth by Hirsch and E. Peters in Can. Metallurgical Quat., 3, 137 (1964).

REDUCING ATMOSPHERE

To be effective the homogeneous nickel catalyst solution requires both hydrogen and carbon monoxide to be present in gaseous form. While nitrogen or inert gases such as helium, argon or neon may also be present in small proportions (less than 20% by volume) without adversely affecting conversions or yields, their presence appears to offer no concurrent advantages and, therefore, is to be avoided.

Ordinarily, the reaction vessel capable of being pressurized, agitated, heated and cooled is charged with all of the components of the reaction mixture, nitro substrate, catalyst system, solvents, etc. These components either individually or collectively may be flushed with inert gas such as argon or nitrogen because of their possible sensitivity to oxidizing agents such as air. The residual flushing or purging of inert gaseous environment is most conveniently accomplished with hydrogen, carbon monoxide or mixtures thereof, and the reaction mixture pressurized to the desired extent and heated in a substantially hydrogen-carbon monoxide atmosphere until the desired reduction to amine takes place.

REDUCTION TEMPERATURE

The range of temperature for reduction is quite flexible. At temperature above 30° up to about 100° C., however, the rate of reduction to the amine is quite slow, while at temperatures much above 250° C. yields fall off sharply, possibly due to catalyst decomposition. For these reasons these extremes of temperatures are to be avoided. Inasmuch as the best yields of amines have been obtained at temperatures between about 100° and 250° C., at pressures greater than atmospheric, these temperatures represent the preferred temperature range.

REDUCTION PRESSURES

Pressures greater than atmospheric (0 p.s.i.g.) are required to obtain reasonable rates of reduction at reaction temperatures above 100° C. Superatmospheric pressures ranging from about 100 p.s.i.g. to about 3000 p.s.i.g., coupled with reduction temperatures of about 100° to 250° C. consistently give the best yields within reasonable reaction times and for this reason these pressures are preferred.

REACTION TIMES FOR SUBSTANTIAL REDUCTION

The time required for substantial reduction of the nitrosubstrates to the corresponding amines is a variable, dependent primarily upon the temperature and pressure employed, the particular nitrosubstrate to be reduced and the catalyst system employed among other factors. Ordinarily the reaction time will vary between about 2 to 24 hours. In most instances times ranging from at least about 3 hours to about 8 hours under the preferred conditions of temperature and pressure are required for substantial reduction and these reaction times represent the preferred range of reaction times.

NICKEL CATALYST SYSTEM

Insofar as is known, any nickel salt may be employed in the instant invention provided that it is soluble and does not precipitate in the basic solvent media. While nickel salts generally are utilizable under the appropriate combination of reaction conditions to reduce nitrosubstrates to their corresponding amines, as is usually the case in any large group or class, one or more members of the subgroup or subclass, for one reason or another, are preferred, compared to the class as a whole. In the instant case the preferred catalysts include the nickel salts of aliphatic or aromatic carboxylic acids such as nickel acetate, nickel octanoate, nickel stearate, and nickel naphthenate as well as the nickel salts of mineral acids such as nickel chloride, nickel bromide, nickel nitrate and nickel sulphate. These salts may be hydrated or in an anhydrous form. Also suitable are the oxides, hydroxides and carbonates of nickel, and nickel tetracarbonyl itself.

The above more restricted groupings of nickel salts are preferred as catalysts in a basic solvent media to reduce nitrosubstrates to their amines, because they combine good selectivity and yields with good reproducibility. In addition they produce the desired amine product under relatively mild reduction conditions within a reasonably short reaction time.

It is not essential that all of the nickel catalysts shall be in solution at the beginning of the reduction provided that at least a catalytic amount is present. A catalytic amount as defined herein refers to an amount sufficient under the appropriate combination of temperature and pressure parameters to initiate the desired reduction. In this instance, if at least 0.01 mole of nickel salt per mole of nitro group is present, within the operable parameters of temperature and pressure, catalysis will take place. Larger ratios of catalyst to substrate do not appear to be deleterious and are primarily limited by economics.

The mole ratio of nitrosubstrate (as typified by mixtures of $C_{10} \rightarrow C_{14}$ nitroparaffins) to homogeneous nickel catalyst should not exceed about 100:1. Preferably a narrower ratio range (about 20:1 to 1:1 of nitrosubstrate to catalyst) should be employed to obtain optimum yields of product coupled with a high order of reproducibility.

PREPARATION AND ISOLATION OF AMINE PRODUCTS

The reductive process is ordinarily performed as follows: A conveniently sized reactor fitted with gas inlet, condenser, stirring, heating and pressurizing means, is charged with catalyst solution, and invert solvent if any, to form a reaction mixture. The agitated mixture is sealed and heated to above 100° C. under superatmospheric pressure provided by hydrogen and carbon monoxide.

Work-up of the product mixture may be as follows: After gas adsorption has substantially ceased, indicating completion of the reduction, the pressurized reactor is cooled and excess gas bled off. The reaction mixture containing amine product, nickel catalyst, catalyst solvent and inert solvent if any, is stripped of volatiles under reduced pressure and the nickel catalyst is filtered or removed by centrifugation. The amine products contained in the reduction filtrate are then recovered by one or more of the methods conventionally used to separate amines from contaminants. For example, the amine can be steam distilled or extracted with mineral acid. In the latter case, the amine salt is converted (sprung) to the free amine by neutralization with a basic material.

In any event, the amine product can be further purified or used as obtained, dependent upon product application. In general, the amines are identified by gas chromatography (GC), elemental analysis, infrared spectra (IR) and/or nuclear magnetic resonance (NMR) spectra.

EXAMPLE 1

Preparation of tridecylamine from nitrotridecane using a homogeneous nickel catalyst Part A.—A suitable autoclave-type reactor provided with pressurizing, heating, cooling, agitating and distillation means is charged with a previously prepared, nitrogen-flushed, homogeneous solution of nickel acetate tetrahydrate (2.5 g. or 10 mmols) dissolved in 100 ml. of solvent mixture comprised of 25 ml. of water and 75 ml. of ethylenediamine. The catalyst mixture is combined with 48 ml. of a liquid mixture composed of 15% by weight of nitrotridecane (20 mmols) and 85% of tridecane. The reactor containing the reaction mixture is sealed, pressurized to 700 p.s.i.g. with an equi-volume gaseous mixture of hydrogen and carbon monoxide and heated to 150° C. for 6 hours.

At the end of this time the heating is terminated, the reactor is cooled and vented to dispel excess gas leaving a two phase solution. The volatiles are removed by evaporation under reduced pressure and IR and gas chromatography confirms the formation of the desired tridecylamine product.

Using the same procedure outlined above and the same nickel catalyst system and the same mol ratio of catalyst to nitroparaffins (1:2 moles) successful reductions of the nitrotridecane substrate to tridecyl amine are obtained at the same temperature (150° C.) and 1:1 volume ratio of hydrogen to carbon monoxide in separate runs using variable pressures of 100 p.s.i.g., 250 p.s.i.g., 750 p.s.i.g. and 1000 p.s.i.g. These are designated parts B, C, D, E and F.

In part E, the procedure of part A is successfully followed substituting diethylenetriamine for the ethylenediamine component on a volume by volume basis.

EXAMPLES 2 TO 7

Varying the nitroparaffin substrate reduced

In these examples the procedure and reactants of Example 1, part A is followed exactly except that the designated nitroparaffin substrate is substituted for nitrotridecane on a mole by mole basis.

Example 2—A mixture of $C_{10}$–$C_{14}$ secondary nitroparaffins.
Example 3—A mixture of $C_{16}$–$C_{20}$ secondary nitroparaffins.
Example 4—Nitrocyclohexane.
Example 5—1-nitrooctane.
Example 6—1-nitroheptane.
Example 7—Nitrocycloheptane.

EXAMPLES 8 TO 11

Varying the nitrogenous base used in the reaction mixture

In these examples, the procedure, reactants and concentration of Example 1, part A is followed except that the following nitrogenous bases are substituted for ethylenediamine per volume basis.

Example 8—Piperidine.
Example 9—3,3'-iminobispropylamine.
Example 10—1,6-hexanediamine.
Example 11—N,N'-dimethylethylenediamine.

EXAMPLES 12 TO 16

Varying the reaction temperature

Using the identical components, solvents, catalysts and pressures employed in Example 1, part A the below designated runs are made using the reaction temperatures set forth below using gas chromatography to determine if tridecylamine is produced.

Example 12—25° C., no tridecylamine is detected.
Example 13—50° C., tridecylamine is formed.
Example 14—100° C., tridecylamine is formed.
Example 15—150° C., tridecylamine is formed.
Example 16—250° C., tridecylamine is formed.

EXAMPLES 17 TO 20

Utilizing other nickel catalysts

In these examples the procedure of Example 1, part A is followed except that the following nickel compounds are substituted for nickel acetate tetrahydrate. Again gas chromatography is used to determine if tridecylamine is formed.

Example 16—Nickel octanoate.
Example 17—Nickel naphthenate.
Example 18—Nickel chloride.
Example 19—Nickel carbonate.

In all instances tridecylamine is formed.

EXAMPLES 21 TO 24

Preparation of aromatic amines from nitroaromatics

Using a similar procedure and the same apparatus and catalyst system described in Example 1, part A, the nitroaromatic substrates listed in Table I (below) are reduced to the corresponding amines under the designated conditions. Gas chromatography, IR and NMR are used to identify the amine products and to estimate the produce yields.

TABLE I[1]

| Ex. | Nitroaromatic substrate | Percent conversion of nitroaromatic | Major product amine Identity | Percent yield |
|---|---|---|---|---|
| 21 | p-Nitrotoluene | 95 | p-Toluidine | 80 |
| 22 | 1-nitronaphthalene | 95 | 1-naphthylamine | 13 |
| 3 | p-Dinitrobenzene | 95 | p-Phenylenediamine | 10 |
| 24 | 1-chloro-4-nitrobenzene | 95 | p-Chloroaniline | 10 |

[1] Run conditions.—Nickel acetate conc.=0.1M; Initial nitroaromatic conc.=0.5M; Reaction temp.=140° C.; Pressure=1,000 p.s.i.g. of $H_2$:CO (1:1); Reaction time=4 hrs.

It is clear from this data that mononitromononucleararomatics, nitropolynucleararomatics, polynitroaromatics and substituted nitroaromatics may be reduced to their corresponding amines using the nickel catalyst system of this invention.

As the numerous examples and the detailed disclosure of this invention indicate, this invention is both novel and advantageous. For example, while homogeneous nickel catalysts of the type disclosed are known to hydrogenate carbon to carbon unsaturation, this is believed to be the first disclosure of their utilization in the reduction of aliphatic and aromaticc nitrosubstrates in a carbon monoxide and hydrogen atmosphere. Further, the reduction process is operable within relatively moderate reaction conditions of temperature and pressure and produces the corresponding amines in comparatively good yields in a form readily isolated using pedestrian methods of separation and purification.

In addition to the above advantages the novel invention permits numerous changes, substitutions and modifications without departing from the inventive concept. For example, the reduction can be conducted in the presence or absence of inert solvent using various basic solvents and to some extent varying mixtures of hydrogen and carbon monoxide.

The best indicia of the metes and bounds of this invention can be determined by the claims which follow, read in the light of the preceding specification.

What is claimed is:

1. A process for reducing nitrosubstrates selected from the group consisting of linear nitroparaffins and cyclic nitroparaffins containing 3 to 30 carbon atoms, mononitronaphthalenes and mononitromononuclear aromatics containing 6 to 30 carbon atoms, to their corresponding amine products utilizing homogeneous nickel catalysts in a nitrogenous basic solvent media consisting essentially of:
   (a) admixing each mole of said nitrosubstrates to be reduced with at least 0.01 mole of at least one nickel compound selected from the group consisting of nickel salts of aliphatic carboxylic acids, nickel salts of aromatic carboxylic acids, nickel salts of mineral acids and nickel carbonate which are at least partially solubilized in a basic solvent media composed of a nitrogenous base consisting of water soluble aliphatic amines having a pKa of about 9.0 to about 11.5, and water;
   (b) heating said admixture of homogeneous nickel catalysts and said nitrosubstrates in the presence of at least stoichiometric quantities of both hydrogen and carbon monoxide, based upon said quantities of nitrosubstrates, under superatmospheric pressure above about 50° C. until the nitrosubstrates are reduced to the corresponding amines; and
   (c) separating the amine products contained therein.

2. The process of claim 1 wherein the reduction is conducted in the presence of inert solvent or diluent.

3. The process of claim 2 wherein the nitroparaffin is in the form of a mixture of nitroparaffins.

4. The process of claim 1 wherein the nitroaromatic substrate is selected from the group consisting of p-nitrotoluene, 1 - nitronaphthalene, p - dinitrobenzene and 1-chloro-4-nitrobenzene.

5. A process for reducing nitrosubstrates selected from the group consisting of linear nitroparaffins and cyclic nitroparaffins containing 6 to 20 carbon atoms, to their corresponding amines utilizing homogeneous nickel catalysts selected from the group consisting of nickel salts of aliphatic carboxylic acids containing 2 to 8 carbon atoms, nickel naphthenate, nickel chloride and nickel carbonate, in a basic solvent media, consisting essentially of:
   (a) admixing each mole of said nitrosubstrate with from 0.05 to 1.0 mole of said nickel catalyst in the presence of a basic solvent media of water and a nitrogenous base consisting of water-soluble aliphatic amines having a pKa of about 9.0 to 11.5;
   (b) heating said reaction mixture between about 100°–250° C. in the presence of at least a stoichiometric quantity of both hydrogen and carbon monoxide based upon said quantities of said nitrosubstrates under superatmospheric pressures ranging from about 100 p.s.i.g. to 3000 p.s.i.g., for a time sufficient to substantially reduce said nitrosubstrate to the corresponding amine; and
   (c) isolating the amino contained therein.

6. The process of claim 5 in which the nitrosubstrate is a nitroparaffin containing 10 to 14 carbon atoms.

7. The process of claim 5 in which the nitrosubstrate is a cyclic nitroparaffin containing 6 to 10 carbon atoms.

8. The process of claim 5 in which the nickel salt catalyst is nickel acetate.

9. The process of claim 5 in which the nickel salt catalysts is nickel octanoate.

10. The process of claim 6 in which the nitroparaffin substrate is a mixture of $C_{10}$–$C_{14}$ nitroparaffins.

11. The process of claim 5 in which the nitroparaffin substrate is nitrocyclohexane.

12. The process of claim 1 in which the nitroaromatic substrate is p-nitrotoluene.

13. The process of claim 1 in which the nitroaromatic substrate is p-dinitrobenzene.

14. The process of claim 1 in which the nitroaromatic substrate is 1-chloro-4-nitrobenzene.

References Cited

UNITED STATES PATENTS

| 3,293,295 | 12/1966 | Mullineaux | 260—563 D |
| 3,110,747 | 11/1963 | Swakon et al. | 260—580 |

FOREIGN PATENTS

| 1,382,981 | 9/1963 | France | 260—580 |
| 1,128,858 | 2/1957 | Germany | 260—580 |

LEWIS GOTTS, Primary Examiner

D. R. PHILLIPS, Assistant Examiner

U.S. Cl. X.R.

260—580, 583 M